UNITED STATES PATENT OFFICE.

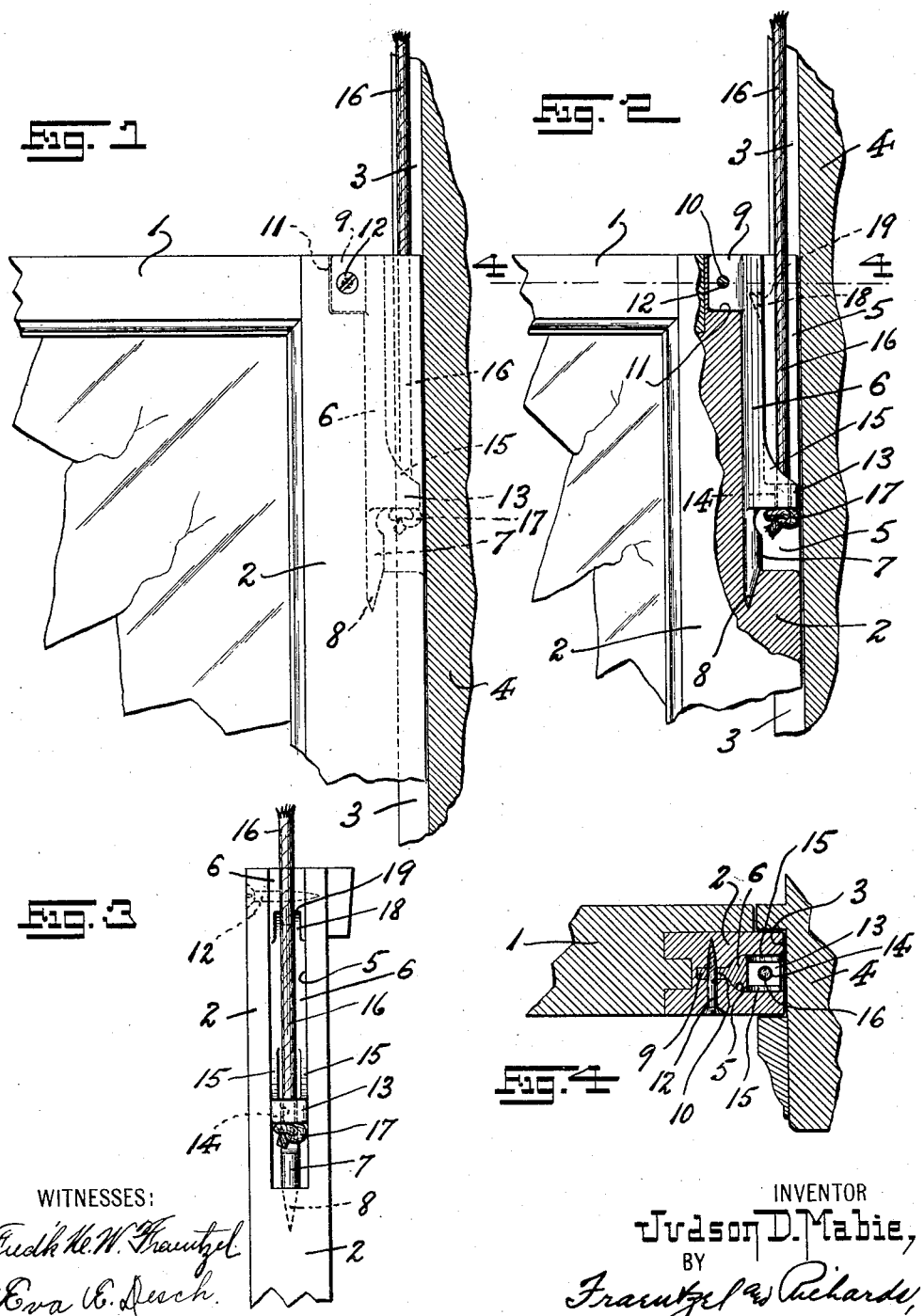

JUDSON D. MABIE, OF BROOKLYN, NEW YORK.

COUPLING FOR SASH-WEIGHT CORDS.

1,159,852.  Specification of Letters Patent.  Patented Nov. 9, 1915.

Application filed March 10, 1915. Serial No. 13,489.

*To all whom it may concern:*

Be it known that I, JUDSON D. MABIE, a citizen of the United States, residing at Brooklyn, in the county of Kings and State of New York, have invented certain new and useful Improvements in Couplings for Sash-Weight Cords; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in means for coupling sash-weight cords, and the like, to window-sashes; and the invention relates, more particularly, to a novel, simple, cheap and easily affixed detachable coupling device by means of which sash-weight cords may be easily and quickly attached to a window-sash without removing the latter from the window-frame grooves in which said window-sash is slidably arranged, or without necessity of removing or in any way disturbing any part of the window-frame.

The invention has for its principal object to provide a novel construction of coupling-device for the purposes above outlined, the construction of which provides a very simple and easily operated means for detachably securing or connecting said coupling device in operative relation to the window-sash stile.

The invention is clearly illustrated in the accompanying drawings, in which:—

Figure 1 is a face view of a portion of a window-sash normally arranged in the window-frame which is shown in section, said window-sash being shown equipped with my novel construction of sash-weight cord coupling device, the latter being shown in its attached relation by dotted lines. Fig. 2 is a similar view, but showing a portion of the window-sash in vertical section with the novel coupling device in operative attached relation thereto, and shown in side elevation. Fig. 3 is an edge view of the window-sash removed from the window-frame illustrating the novel coupling device in front elevation, and attached in normal operative relation to said window-sash. Fig. 4 is a detail horizontal section taken on line 4—4 in said Fig. 2, looking in a downward direction.

Similar characters of reference are employed in all of the hereinabove described views to indicate corresponding parts.

Referring now to the said drawings, the reference character 1 indicates a portion of the window-sash having the usual vertical stiles 2, at each side, which are slidably arranged to run in the grooves or channels 3 of the window-frame 4. Each vertical stile 2 has a suitable cutaway portion, groove or channel 5 which extends downwardly from the upper end thereof for a suitable distance.

The reference character 6 indicates the main body of the novel sash-weight cord coupling-device, made according to and embodying the principles of my present invention, the same comprising a vertically disposed longitudinal portion shaped on one side to conform to the contour of the bottom of the said groove or channel 5 in which the same may be slidably moved longitudinally. Connected with the lower end of said main-body 6 is a spur-portion 7 terminating in a sharpened piercing-point 8, which, when said main body 6 is slid downwardly in said groove or channel 5 to its normal operative relation to the stile 2 of the window-sash, pierces the wood of the stile at the bottom end or termination of said groove or channel 5, whereby the lower end of said main-body 6 is retained against any displacement from its seated relation in said groove or channel 5. Connected with the upper end of said main-body 6 is an inwardly or laterally extending ear or lug 9, having a suitably disposed perforation or opening 10. The vertical stile 2 is mortised at 11 for the reception of said ear or lug 9. When said main-body 6 is moved downwardly in said groove or channel 5 to its operatively related position therein and connected with said stile 2, a fastening-screw 12 may be passed through said stile 2 and through the perforation or opening 10 of said ear or lug 9, whereby, not only is the upper end of said main-body 6 secured against displacement from its seated relation in said groove or channel 5, but said main-body and parts connected therewith are held securely against upward strains or pulls, so that the same cannot be slid upwardly and out of said groove or channel 5 until said fastening screw 12 is removed. Extending outwardly from the lower end of said main-body 6 is a coupling-lug 13 provided with a vertically disposed opening 14 of but slightly larger diameter than the diameter of a sash-weight cord to be passed therethrough. Said coupling-lug 13 is braced against upward pulling strains by means of bracing-webs 15 formed in connection with its side marginal edges and extending upwardly and rearwardly to said main-body 6. In applying the said coupling-device above described to the window-sash 1, the same is withdrawn out of said groove or channel 5, and the end of a sash-weight cord 16, or the like, is passed through the opening 14 of the coupling-lug 13, and a knot 17 formed in the end thereof, which knot 17 is pulled against the underside of said coupling-lug 13, thus securely fastening the sash-weight cord 16 to the coupling-device. After the sash-weight cord 16 has thus been secured to the coupling-device, the latter is inserted in the upper end of said groove or channel 5 in the stile 2, and driven downwardly therein until the spur-portion 7 penetrates the wood of the stile 2 at the bottom end of said groove or channel 5, and the ear or lug 9 seats itself in the mortise 11, thereupon the fastening screw 12 may be secured laterally through the stile 2 so that the same passes through the perforation 10 of the ear or lug 9, thus securely fastening said coupling-device in operative connection with the window-sash. If a sash-weight cord 16, thus coupled with the window-sash 1, should break or become otherwise disconnected and have to be refastened to the window-sash, the fastening-screw 12 is withdrawn so that the coupling-device may be pulled up and out of said groove or channel 5, and as an aid to this operation the outer face of said main-body 6 is provided, adjacent to its upper end, with a suitably formed indentation 18, the upper end of which provides a gripping or lift-lip 19, so that a suitable hook-shaped instrument may be inserted therein so that the force of an upward pull thereon may be transmitted to said coupling-device to start the same from its seated position in said groove or channel 5, and finally permit of its entire and bodily withdrawal from said groove or channel 5. When the coupling-device is thus removed the sash-weight cord may be refastened thereto, or a new cord secured thereto, and then the coupling-device may be replaced in the manner hereinbefore described.

It will be apparent from an inspection of the accompanying drawings, as well as from the above description, that all of the above operations in the use of the novel coupling-device may be performed without removing either the window-sash from the window-frame or without removing or disturbing any part of the window-frame itself.

From the above description it will be evident that the present invention provides a very simple, cheap, efficient and easily and quickly attached or detached coupling-device for the purposes described, and it will also be understood that the novel coupling-device may be made in one-piece as a metal casting, or that it may be made of sheet-metal, or that it may be made of any material other than metal which may prove suitable for the purpose, providing the essential features of its construction are attained.

I am aware that some changes may be made in the general arrangements and combinations of the various devices and parts of the novel coupling-device, as well as in the details of the construction of the same, without departing from the scope of the present invention as set forth in the foregoing specification, and as defined in the claim which is appended thereto. Hence, I do not limit my present invention to the exact arrangements and combinations of the various devices and parts as described in the said specification, nor do I confine myself to the exact details of the construction of the said parts as illustrated in the accompanying drawings.

I claim:—

The combination with a window-sash having a channel of a coupling-device for sash-weight cords comprising a longitudinally extending removable main-body adapted to be inserted in said channel, an outwardly extending perforated coupling-lug connected with said main-body with which a sash-weight cord may be connected, bracing-webs extending upwardly between said coupling-lug and said main-body, a rearwardly extending perforated lug connected with the upper end of said main-body, a fastening means adapted to be passed through said window-sash and said perforation of said lug, a sharpened spur-portion extending downwardly from the lower end of said main-body and adapted to penetrate the bottom end of the channel of said window-sash when said main-body is operatively connected therewith, and a gripping or lifting lip formed by an indentation provided in the face of said main-body for the application of a tool to the latter to remove the same from said channel of said window-sash.

In testimony, that I claim the invention set forth above I have hereunto set my hand this 8th day of March, 1915.

JUDSON D. MABIE.

Witnesses:
GEORGE D. RICHARDS,
W. J. McCAFFREY.

Copies of this patent may be obtained for five cents each, by addressing the "Commissioner of Patents, Washington, D. C."